US007040642B2

(12) United States Patent
Lowry

(10) Patent No.: US 7,040,642 B2
(45) Date of Patent: May 9, 2006

(54) COVER FOR A WHEEL CHAIR GRIP RING

(76) Inventor: Douglas B. Lowry, c/o Douglas Aviation, 825 Augusta Ave., Morgantown, WV (US) 26501

( * ) Notice: Subject to any disclaimer, the term of this patent is extended or adjusted under 35 U.S.C. 154(b) by 27 days.

(21) Appl. No.: 10/259,466

(22) Filed: Sep. 30, 2002

(65) Prior Publication Data

US 2004/0061306 A1 Apr. 1, 2004

(51) Int. Cl.
*B62M 1/14* (2006.01)

(52) U.S. Cl. ...................... 280/304.1; 16/431; 16/435; 150/155

(58) Field of Classification Search ............ 280/304.1, 280/250.1, 340.3; 16/421, 430, 431, 432, 16/435; 74/558, 558.5, 557; 150/154, 155; 152/152, 221, 217
See application file for complete search history.

(56) References Cited

U.S. PATENT DOCUMENTS

| | | | | |
|---|---|---|---|---|
| 1,303,224 | A | 5/1919 | Achtmeyer | |
| 4,441,382 | A * | 4/1984 | Snooks | 74/558 |
| 4,971,645 | A | 11/1990 | Licus | |
| 5,251,506 | A | 10/1993 | Itagaki | |
| 5,511,445 | A | 4/1996 | Hildebrandt | |
| 5,743,154 | A | 4/1998 | Jacinth | |
| 5,848,559 | A * | 12/1998 | Harrill | 74/558 |
| 5,871,269 | A * | 2/1999 | Chien | 362/474 |
| 6,408,715 | B1 * | 6/2002 | Huang | 74/558 |
| 6,439,281 | B1 | 8/2002 | Hogg | |
| 6,763,625 | B1 * | 7/2004 | Durham | 40/590 |
| 2001/0007389 | A1 | 7/2001 | Frauwirth | |

FOREIGN PATENT DOCUMENTS

GB 2 106 841 A 4/1983

OTHER PUBLICATIONS

International Search Report dated Apr. 20, 2004 issued in corresponding international application PCT/US03/30596.

* cited by examiner

*Primary Examiner*—Anne Marie Boehler
(74) *Attorney, Agent, or Firm*—Connolly, Bove, Lodge & Hutz LLP

(57) ABSTRACT

Covers for a grip ring of a wheel chair are disclosed. According to certain embodiments of the invention, a two-piece cover is provided. The two-piece cover includes a soft, resilient inner pad and an outer sleeve enclosing the inner pad. According to other embodiments of the invention, a one-piece cover is disclosed. The one-piece cover includes a soft, resilient inner pad and an outer layer permanently attached to the inner pad. Both the one-piece and two-piece covers can be easily removed from or installed on the grip ring. The covers according to the present invention fit securely over wheelchair grip rings, providing a cushioned, enlarged gripping area for the wheelchair user. The covers improve the performance, feel and safety of grip rings.

25 Claims, 19 Drawing Sheets

COVER FOR A WHEEL CHAIR GRIP RING

FIELD OF THE INVENTION

The present invention relates to a cover for a grip ring of a wheelchair.

BACKGROUND OF THE INVENTION

Many hand-propelled wheelchairs are equipped with a pair of grip rings, or hand rims. Each grip ring is mounted outboard of a respective wheel of the wheelchair. A series of posts, or standoffs, extend between an inner side of the grip ring and an outer side of a rim portion of the wheel, and attach the grip ring to the wheel. Typically, grip rings are constructed of steel tubing or composite material tubing. The grip rings are used by the wheelchair operator to propel and maneuver the wheelchair.

Conventional grip rings have several disadvantages. Grip ring tubing typically has a relatively small diameter, which provides a limited gripping surface for a user. As a result, the user will experience difficulty propelling the wheelchair in certain situations, such as when traveling up ramps, traversing carpeted areas or traversing rough terrain. The limited gripping surface provided by the conventional grip ring also makes it difficult for the user to stop the wheelchair when descending declined surfaces or when traveling at high speeds.

The lack of sufficient gripping surface can cause the user to resort to improper and dangerous techniques to propel and maneuver the wheelchair. For example, the user may simultaneously grip both the wheel and the grip ring while propelling the wheelchair or the user may grip substantially the entire diameter of the grip ring while braking the wheelchair in order to obtain a greater gripping surface. Both of the aforementioned techniques can result in injury to the user, because the user may catch her fingers in the spokes of the wheel while attempting to propel the wheelchair, or she may catch her fingers in the standoffs while attempting to brake the wheelchair.

Furthermore, the conventional grip ring is generally uncomfortable to the user's hand. The small surface area of the grip ring, the combination of the shape of the grip ring and the hardness off the grip ring makes the grip ring uncomfortable to use.

Additionally, the conventional grip ring can become even more uncomfortable and dangerous to use under adverse conditions. For example, conventional grip rings are slippery when they are wet, and the steel surfaces of the grip ring can become uncomfortably hot or cold depending on the temperature of their environment.

Attempts have been made in the prior art to provide improved grip rings for wheelchairs. For example, U.S. Pat. No. 6,120,047 teaches a dual grip ring assembly including a large grip ring mounted on a wheel of a wheelchair and a small grip ring mounted to and disposed outboard of the large grip ring. The large grip ring includes a foam coating and the small grip ring is constructed of aluminum. The large grip ring and small grip ring are designed to be gripped together to propel the vehicle, thereby providing a relatively large gripping area. The small grip ring is designed to be gripped alone for braking the wheelchair. Although this invention may improve performance in maneuvering the wheelchair, it adds significantly to the cost and assembly time of the grip ring assembly. Additionally, people with small hands (such as women and children) or arthritic hands may find it difficult to grip the dual grip ring assembly.

Furthermore, the dual grip ring assembly substantially increases the width of the wheelchair over conventional grip ring assemblies, thereby making it more difficult to maneuver the wheelchair through tight spaces. U.S. Pat. No. 6,276,705 B1 teaches a double-rimmed grip ring assembly for a wheelchair. The grip ring assembly includes a first rim, a second rim coaxially aligned within the first grip ring and a vinyl-coated concave trough connecting the first rim to a wheel of the wheelchair. This assembly provides a high-friction gripping surface, but is substantially more complicated and costly to manufacture than conventional grip ring assemblies. Also, as is the case with U.S. Pat. No. 6,120,047, people with small hands or arthritic hands may find it difficult to grip both rims of the grip ring assembly. U.S. Pat. No. 6,241,268 B 1 discloses a grip ring having a friction coating on its upper surface. This invention provides a high friction gripping surface, but does not improve the comfort or substantially increase the gripping area of the grip ring.

Therefore, a device that improves the performance, comfort and safety of the conventional grip ring is needed. More particularly, a device that improves the traction, gripping area and feel of the conventional grip ring, without significantly adding to the cost or complexity of the grip ring and without significantly increasing the width of the wheelchair, is needed.

BRIEF SUMMARY OF THE INVENTION

The present invention discloses various embodiments of a cover for a wheelchair grip ring. The cover according to the present invention includes an inner pad constructed of a soft, resilient material and an outer sleeve constructed of a durable material that is resistant to slippage and extreme temperature changes. The grip ring cover is easily removed and installed on a grip ring of a wheelchair.

According to the present invention, the grip ring cover comprises a substantially ring-shaped member. The inner pad includes a substantially tubular wall that substantially encloses the grip ring. The outer sleeve wraps and fastens around the inner pad to secure the inner pad to the grip ring. According to some embodiments of the invention, the outer sleeve is detachable from the inner pad. According to other embodiments of the invention, the outer sleeve is permanently attached to the inner pad. The outer sleeve may also include reflective or luminescent material to improve the visibility of the grip ring over.

The grip ring cover of the present invention provides an increased gripping diameter for wheelchair users and provides a cushioned gripping surface that resists slippage and extreme temperature changes. Therefore, the present invention improves the performance, comfort and safety of wheelchair grip rings. Furthermore, the present invention achieves the aforementioned benefits without great expense or complicated assembly, and without substantially affecting the width of the wheelchair.

The invention, along with additional features and advantages thereof, may be best understood with reference to the following detailed description and accompanying drawings.

DETAILED DESCRIPTION OF THE INVENTION

The present invention will now be described in detail with reference to FIGS. 1–11B, wherein the same reference numbers indicate the same elements.

Figure 1A:
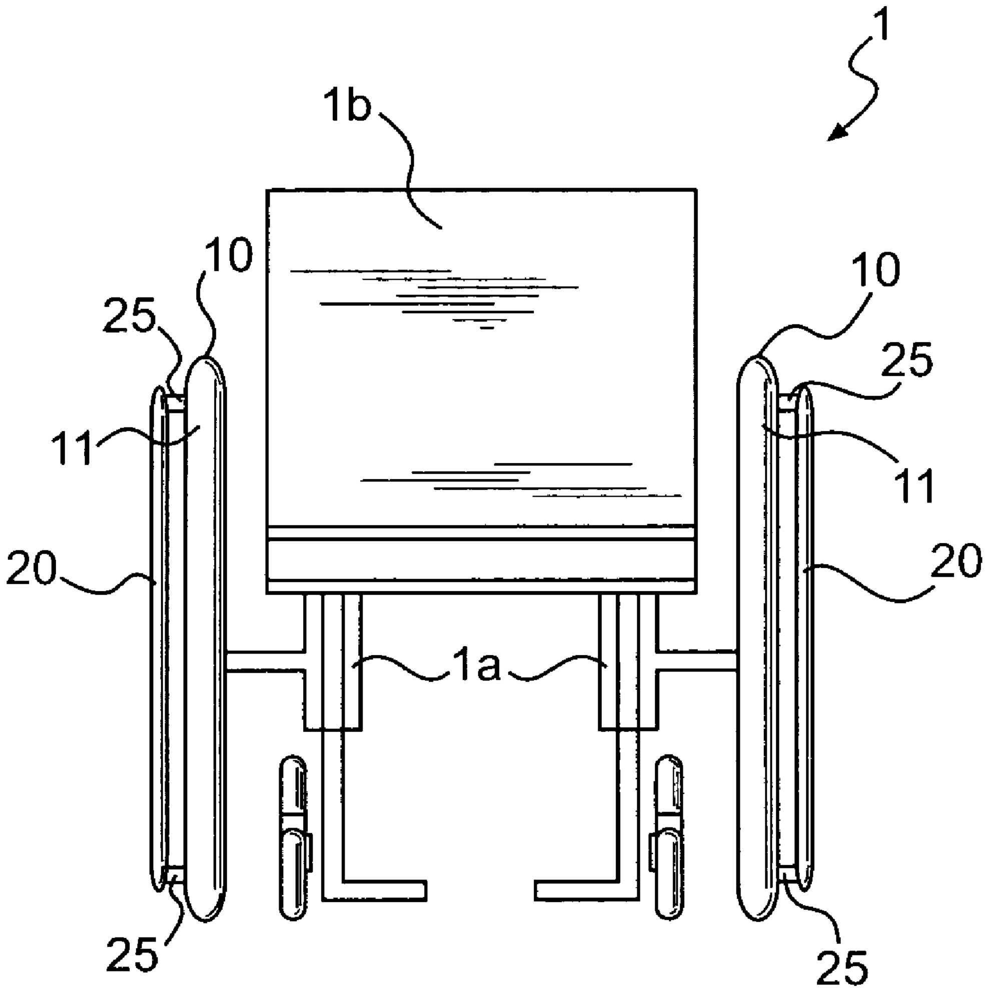
FIG. 1A (PRIOR ART)
FIG. 1A is a perspective view of a prior art wheelchair grip ring.
Figure 1B:
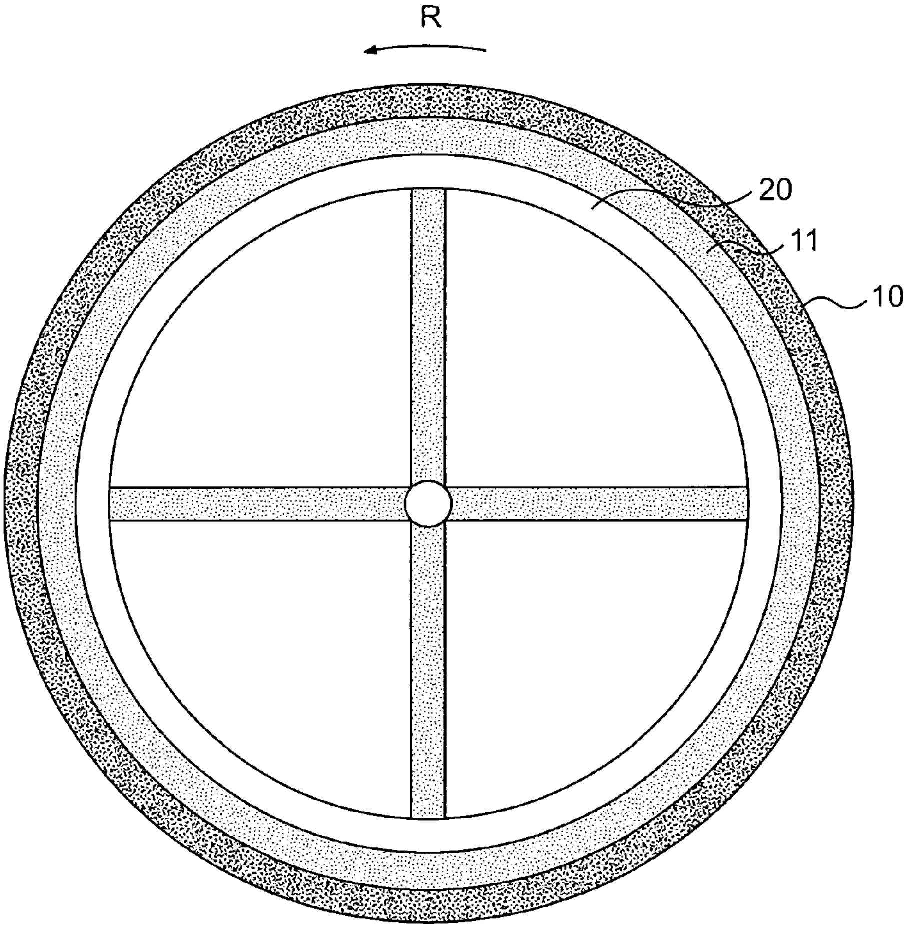
FIG. 1B (PRIOR ART)
FIG. 1B is a cut-away outboard view of a wheel and grip ring of the prior art wheelchair of FIG. 1.

FIG. 1A shows a prior art wheelchair 1 including a frame 1*a*, a seat 1*b* attached to the frame 1*a*, a wheel 10 rotatably attached to the frame a, and a grip ring 20 connected to and disposed outboard of the wheel 10. Standoffs 25 attach the grip ring 20 to a rim 11 of the wheel 10. Each standoff 25 extends between a location on the inside face 20*a* of the grip ring 20 and a location on the outside face 11*a* of the rim 11, and space the grip ring 20 outboard of the wheel 10. FIG. 1B shows an isolated view of the prior art wheel 10 and grip ring 20. As shown in FIG. 1B, the grip ring rotates in a rotational direction R.

Figure 2A:
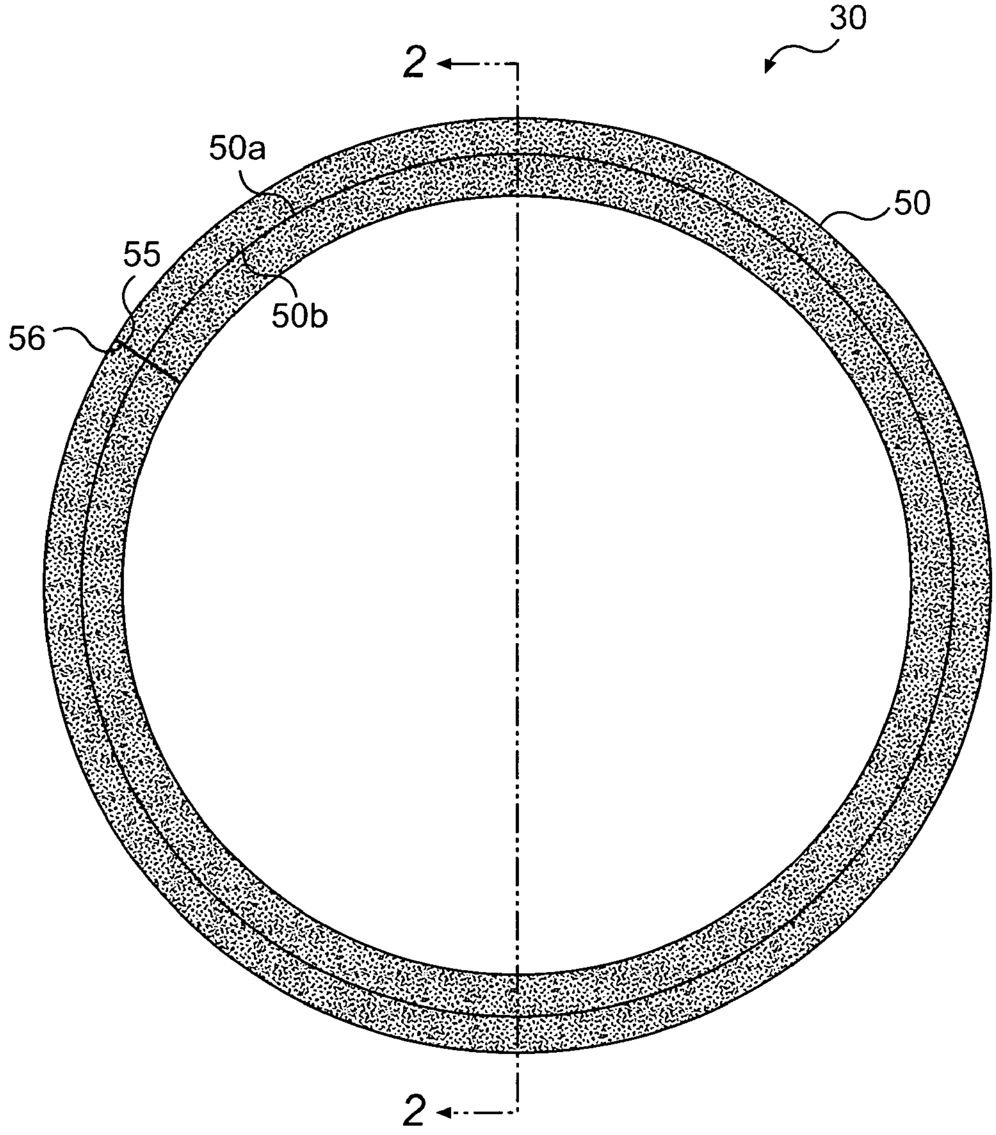
FIG. 2A is an inboard side view of a grip ring cover according to one embodiment of the present invention.
Figure 2B:
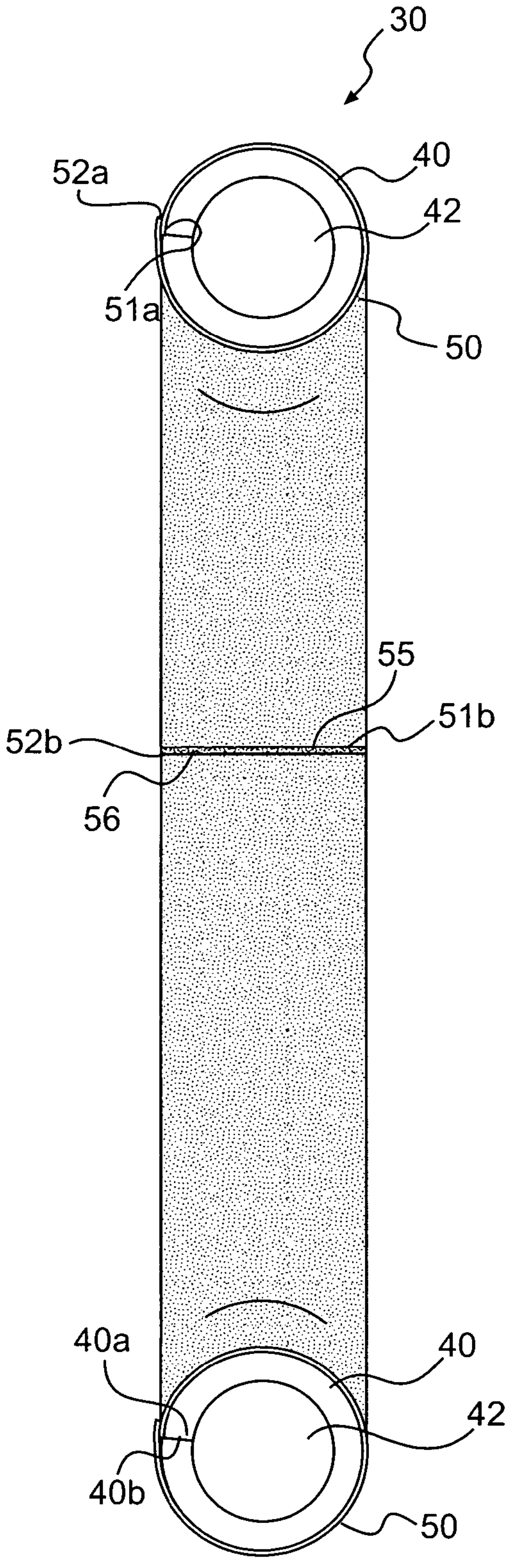
FIG. 2B is a sectional view taken along line 2—2 of FIG. 2A.

FIGS. 2A and 2B show a grip ring cover 30 according to one embodiment of the invention. As shown in FIG. 2A, the grip ring cover 30 is a substantially ring-shaped cover. As is best shown in FIG. 2B, the grip ring cover 30 comprises an inner pad 40 and an outer sleeve 50 that, when the grip ring cover 30 is assembled, is snugly secured or wrapped around the exterior surfaces of the inner pad 40.

Figure 3A:
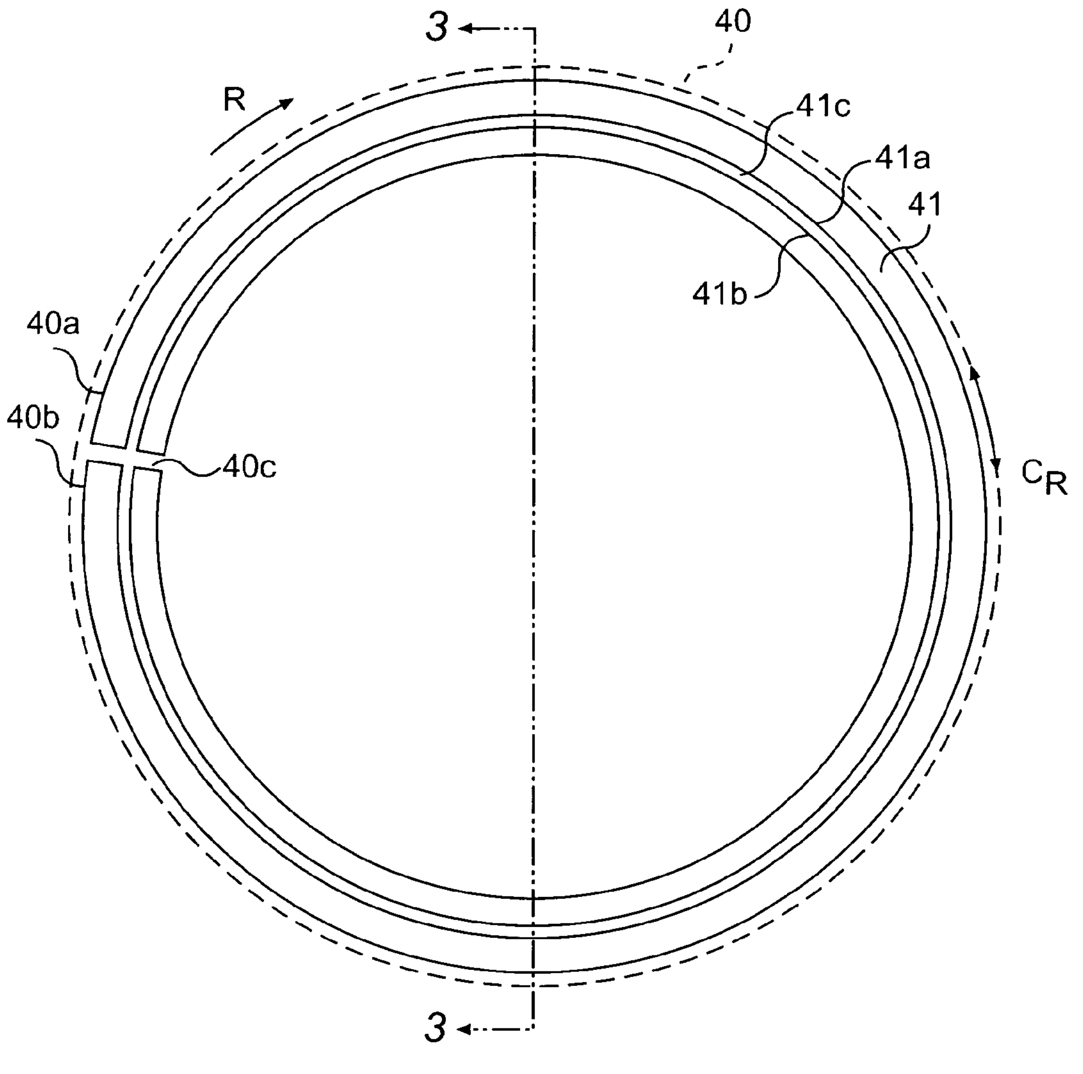
FIG. 3A is an inboard view of an inner pad of the grip ring cover of FIG. 2A.
Figure 3B:
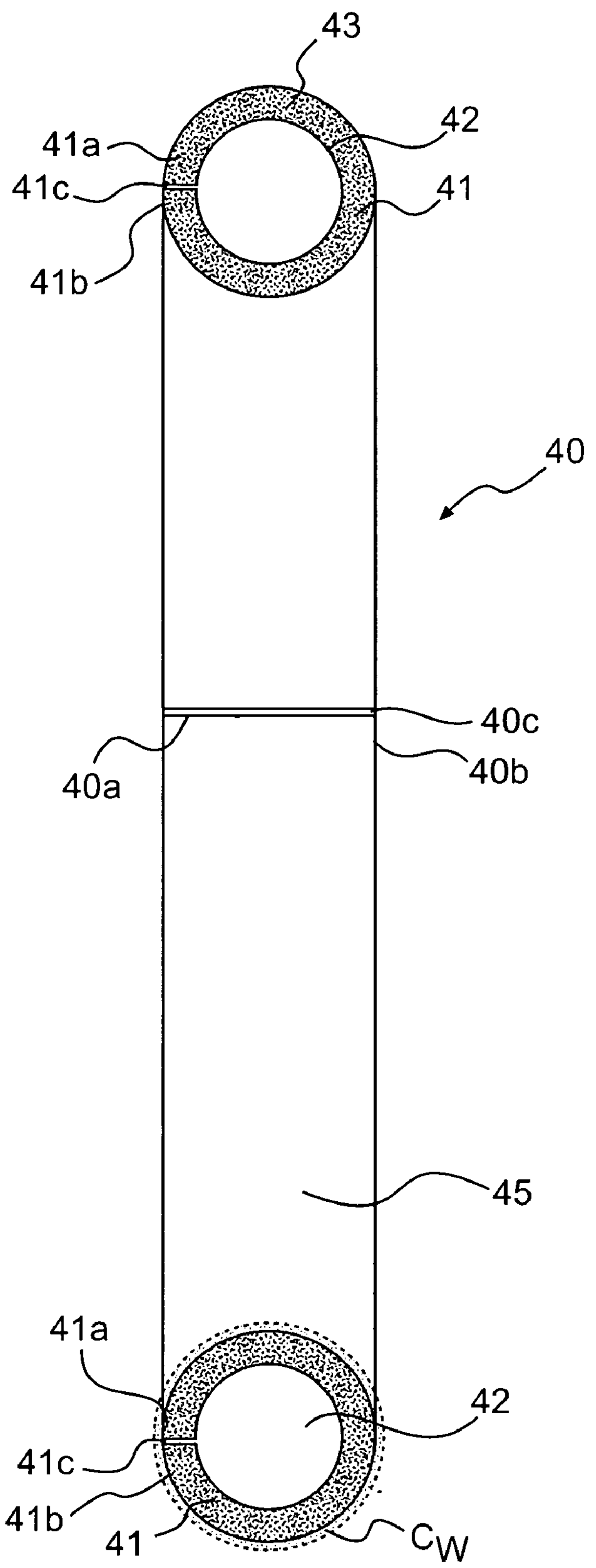
FIG. 3B is a sectional view taken along line 3—3 of FIG. 3A.

Referring to FIG. 3A, the inner pad 40 comprises a generally ring-shaped tube having adjacent first and second free ends that are 40*a* and 40*b* separated by a gap 40*c*. As shown in FIG. 3B, the inner pad 40 includes a substantially tubular wall 41 having first and second adjacent edges 41*a* and 41*b* that are separated by a circumferential gap, or open channel 41*c* in the wall 41 that extends circumferentially along the inner pad 40 in the rotational direction R of the grip ring 20. Circumferential edges 41*a* and 41*b* may include adhesive elements 46*a* and 46*b*, respectively. The adhesive elements 46*a* and 46*b* may cover a portion of the surfaces of the respective edges 41*a* and 41*b*, or may cover the entire surface of the edges 41*a* and 41*b*. Preferably, the adhesive elements 46*a* and 46*b* comprise and adhesive covered by a peel-off covering strip that may be peeled off to expose the adhesive. The inner pad 40 further includes a hollow interior 42 bounded by an inner wall surface 43 of the wall 41. The circumferential gap 41*c* communicates with the hollow interior 42 of the inner pad 40 to accommodate the grip ring 20, as will be described later. The inner pad 40 is preferably constructed of foam, but may be constructed of other soft, resilient materials.

Figure 4A:
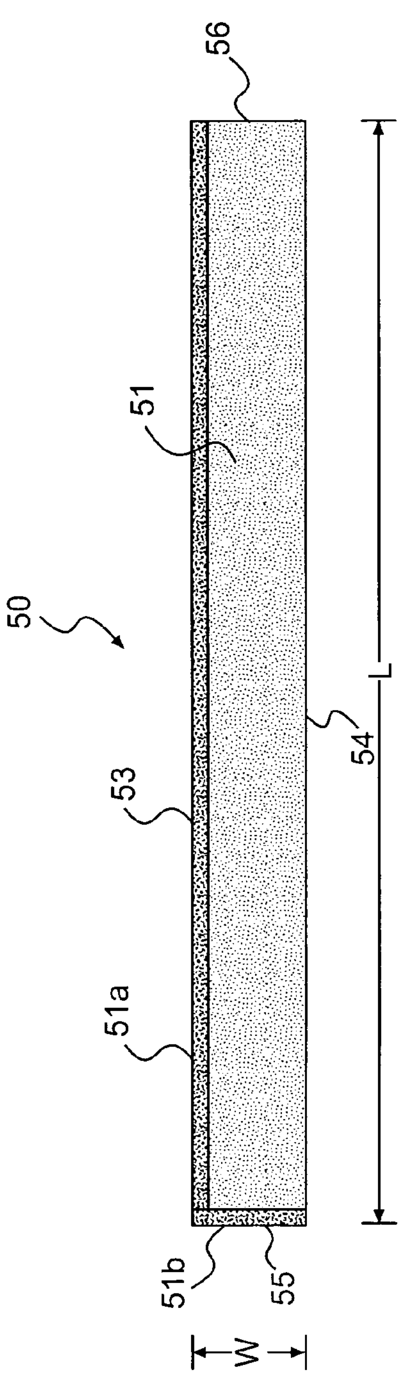
FIG. 4A is a view of an outside surface of an outer sleeve of the grip ring cover of FIG. 2A.
Figure 4B:
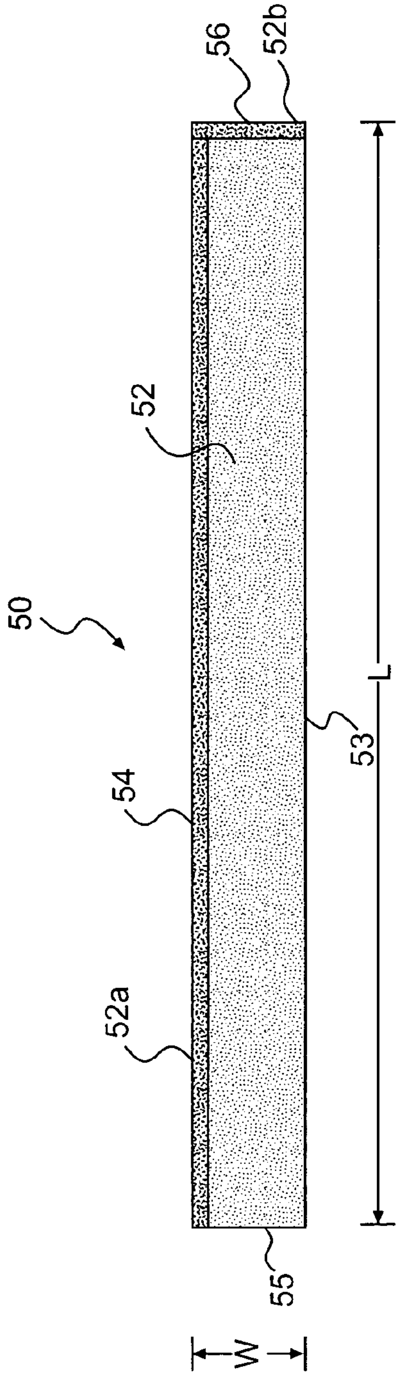
FIG. 4B is a view of an inside surface of the outer sleeve of 4A.

As shown in FIGS. 4A and 4B, the outer sleeve 50 comprises a sheet of material having an outer surface 51 to be gripped by a wheelchair user and an inner surface 52 for contacting the outer surface of the inner pad 40. The outer sleeve 50 is bounded by a first side 53, a second side 54 opposite the first side 53, a first end 55 extending between the opposed sides 53 and 54, and a second end 56 opposite said first end 55 and extending between the opposed sides 53 and 54. The width W of the sleeve 50 is slightly greater than the outer wall circumference $C_w$ of the wall 41 of the inner pad 40 so that the sleeve 50 can be closed around the inner pad 40. The length L of the outer sleeve 50 is slightly greater than the outer rotational circumference $C_R$ of the inner pad 40 so that the end 56 overlaps the end 55 when installed on the grip ring 20, as will be further described later on. Preferably, the length L of the outer sleeve is at least two inches greater than the circumference $C_R$ of the inner pad to ensure proper closure of the outer sleeve 55 over the inner pad 40. Although the sleeve 50 is shown in FIGS. 4A and 4B as a rectangular sheet, the sleeve 50 may be constructed in other suitable shapes. The outer sleeve 50 is preferably constructed of leather, but may alternatively be constructed of vinyl, a pliable plastic or a durable fabric.

According an additional embodiment of the invention, the outer sleeve 50 may be constructed of a luminescent material or may include some luminescent material to improve visibility of the cover 30 under dark lighting conditions. Thus, the luminescent material would allow the user to easily identify and grasp the grip ring cover 30 under dark lighting conditions, and would also make the wheelchair 1 more visible to others under dark lighting conditions. According to another embodiment of the invention, the outer sleeve may be constructed of a reflective material or may include some reflective material to improve the visibility of the wheelchair 1 under dark lighting conditions.

Figure 6A:
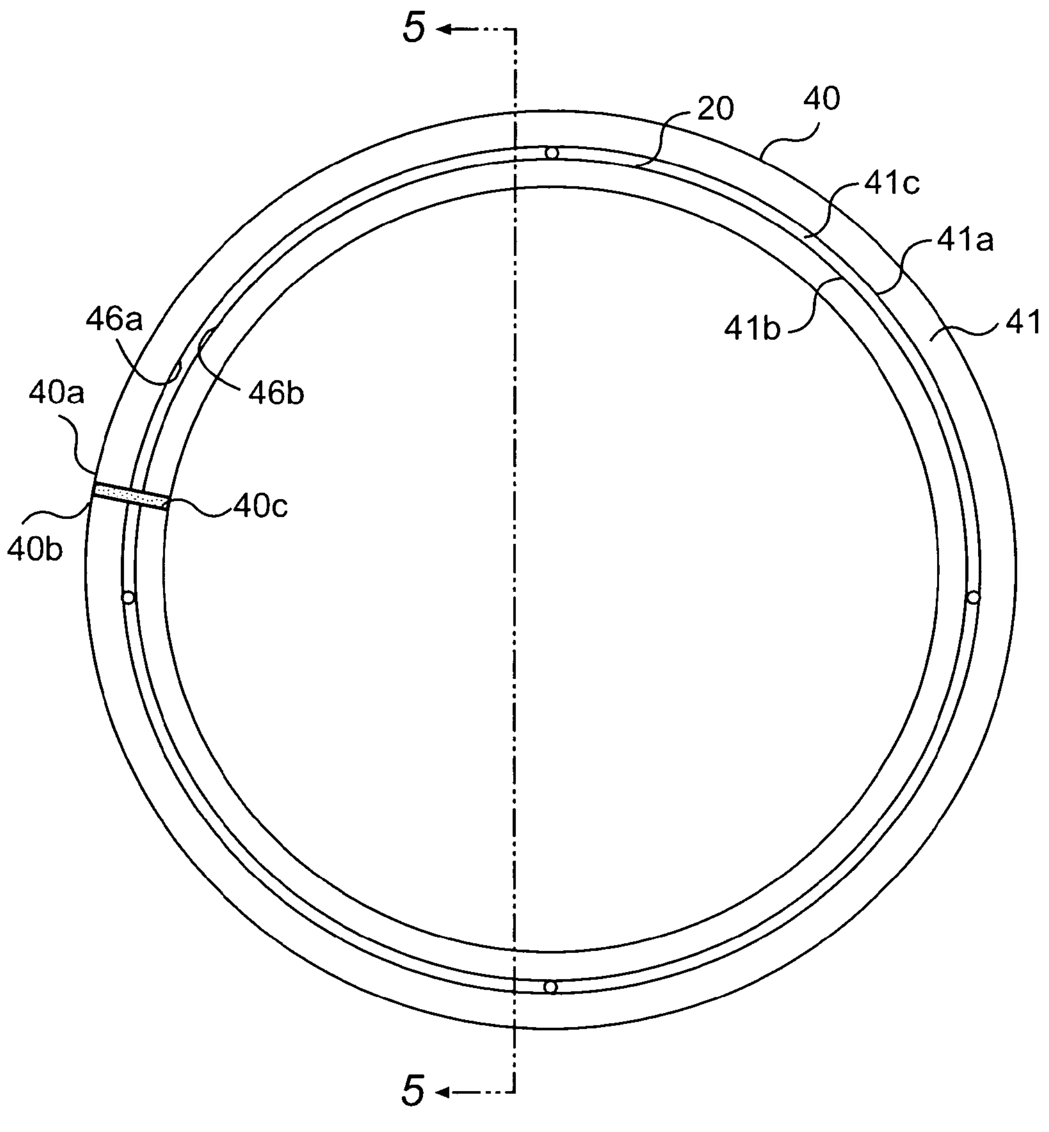
FIG. 6A is an inboard cut-away view of the inner pad of FIG. 3A installed on a grip ring.

Referring still to FIGS. 4A and 4B, a first side fastening element 51*a* is disposed on the outer surface 51 proximate the first side 53. A second side fastening element 52*a* is disposed on the inner surface 52 proximate the second side 54, and is compatible with the first side fastening element 51*a* for closing the outer sleeve 50 around the inner pad 40. The sleeve 50 may also include first and second end fastening elements 51*b* and 52*b*. As shown in FIG. 6A, the first end fastening element 51*b* is disposed on the outer surface 51 proximate the first end 55. The second end fastening element 52*b* is disposed on the inner surface 52 proximate the second end 56 and is compatible with the first end fastening element 51*b* for fastening the first end 55 to the second end 56 around the inner pad 40.

The arrangement of the fastening elements described above is by way of example only, and other fastening arrangements may be used. For example, the side fastening elements 51*a* and 52*a* may each be placed proximate sides 54 and 53, respectively, with respect to the configuration described above, and the end fastening elements 51*b* and 52*b* may be placed proximate ends 56 and 55, respectively, with respect to the configuration described above.

According to a preferred embodiment of the invention, the fastening elements 51*a*, 52*a*, 51*b* and 52*b* comprise Velcro fasteners. However, other suitable fasteners may be used.

Figure 5A:
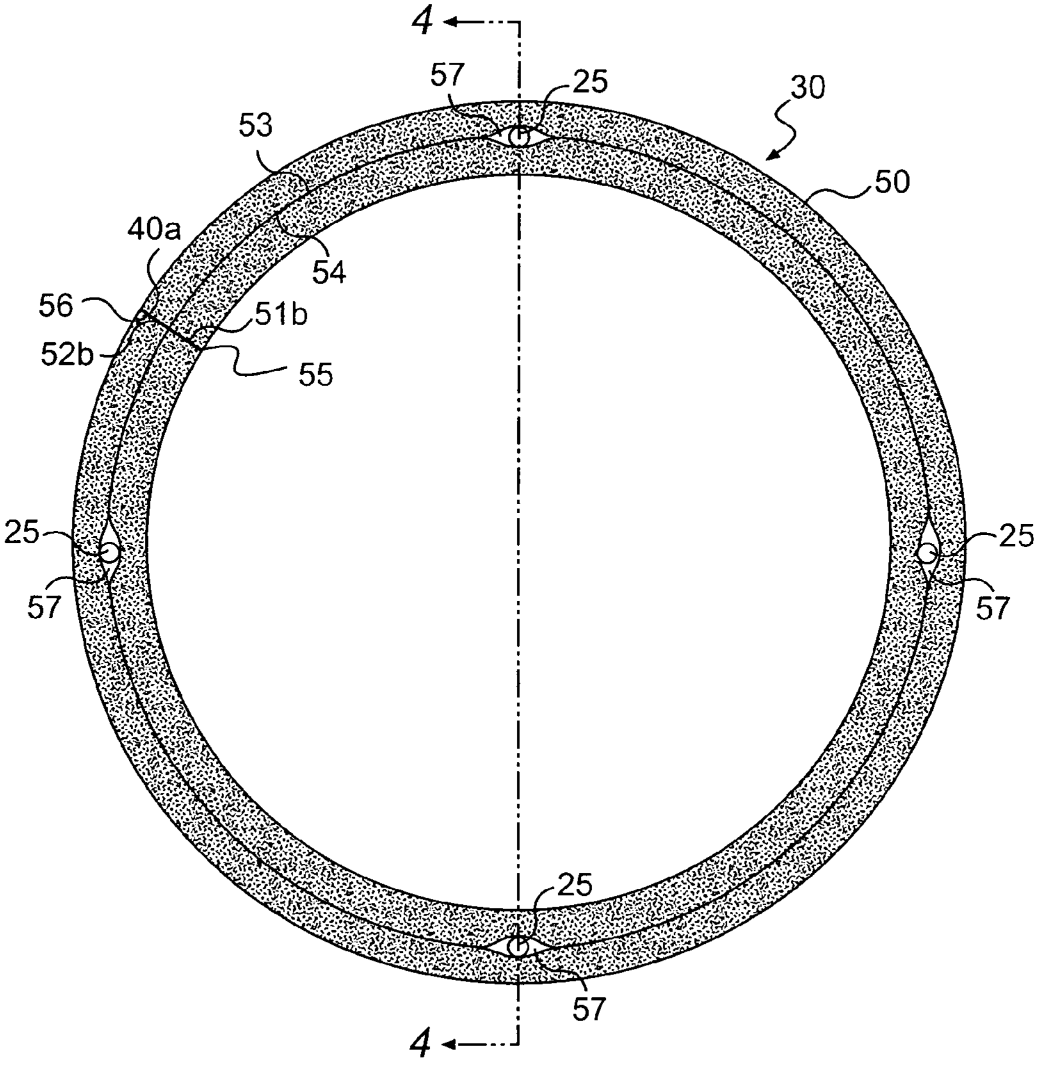
FIG. 5A is an inboard cut-away view of the grip ring cover of FIG. 2A installed on a grip ring.
Figure 5B:
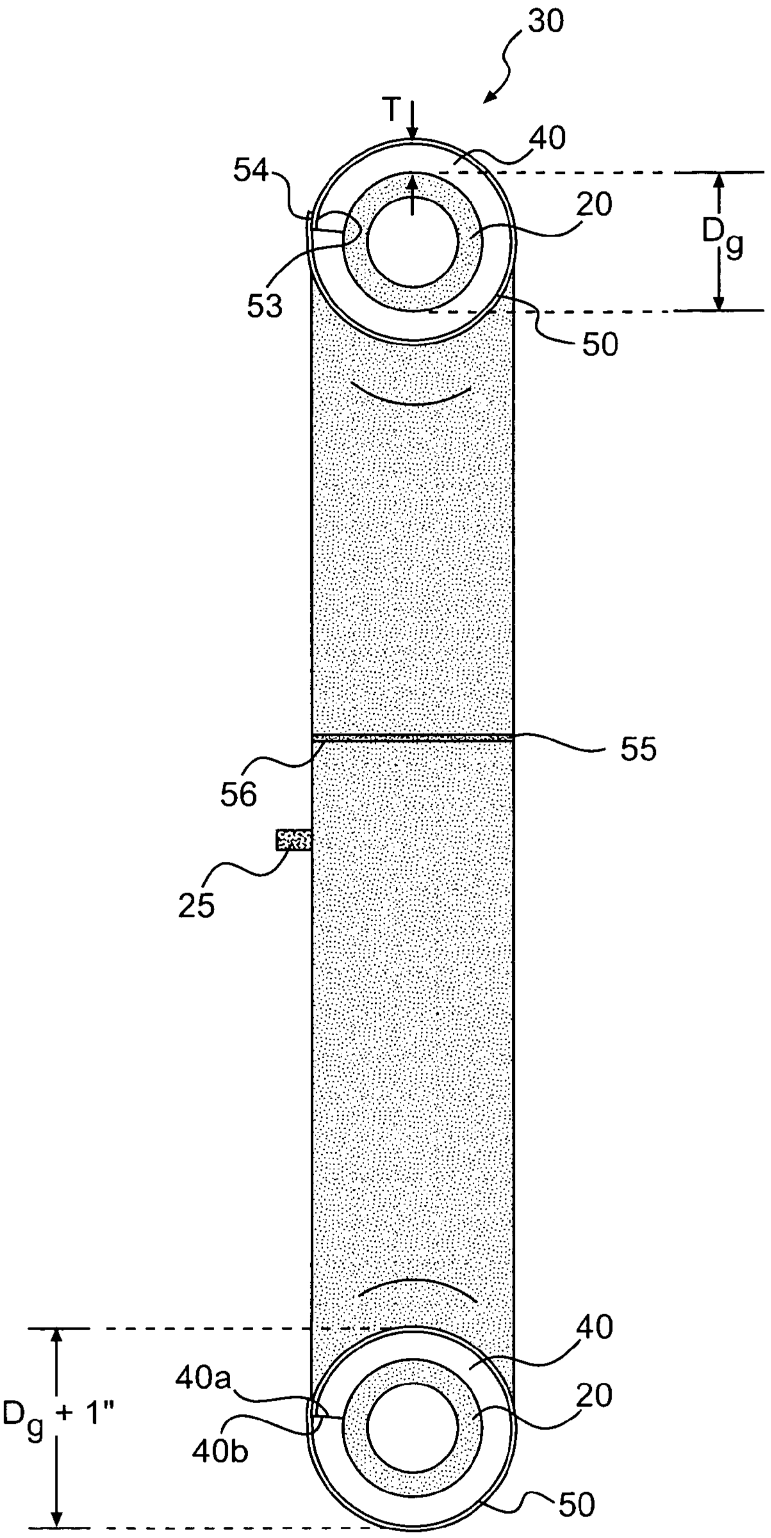
FIG. 5B is a sectional view taken along line 4—4 of FIG. 5A.

FIGS. 5A and 5B show the grip ring cover 30 fully assembled and installed on the grip ring 20. When the cover 30 is installed on the grip ring 20, the cover 30 substantially encloses the grip ring 20. More particularly, the inner pad 40 substantially encloses the grip ring 20 and the outer sleeve 50 substantially encloses the inner pad 40. Preferably, the thickness T of the cover 30 (i.e., the combined thickness of the tubular wall 41 of the inner pad and the outer sleeve 50) is approximately 0.5 inches, thereby increasing the gripping diameter $D_g$ of the grip ring 20 by approximately one inch, as shown in FIG. 5B. Sizing the cover 30 in such a manner will provide a substantial increase in cushioning and gripping area for a user while still providing suitable clearance between the grip ring assembly (the grip ring 20 and cover 30) and the terrain traversed by the wheelchair. However, the thickness T may be larger or smaller than the preferred size, so long as sufficient clearance is be maintained between the cover 30 and the wheel 10 and between the cover 30 and the terrain to be traversed, and so long as the cover 30 provides sufficient padding for the user.

Figure 6B:
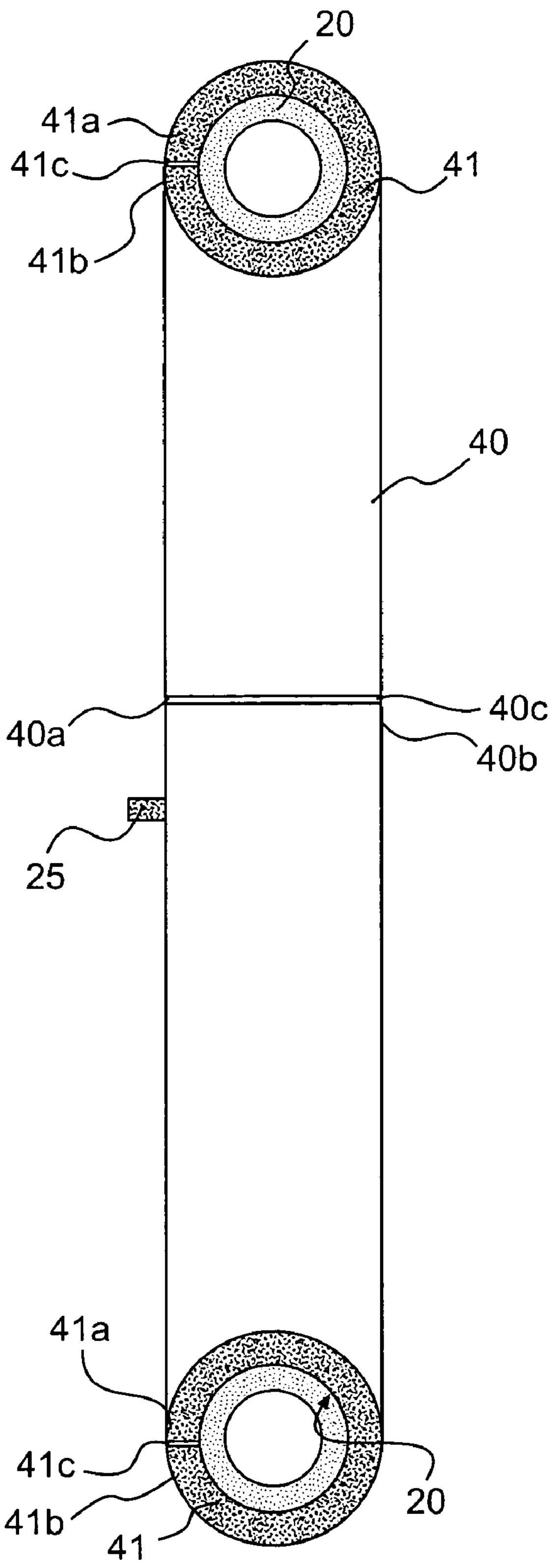
FIG. 6B is a sectional view taken along line 5—5 of FIG. 6A.

As shown in FIGS. 6A and 6B, the inner pad 40 substantially encloses the grip ring 20. The grip ring 20 is enclosed within the interior 42 of the inner pad 40 and the standoffs 25 are disposed within the gap 41*c*. The edges 41*a* and 41*b* are bonded together via the adhesive elements 46*a* and 46*b*, thereby securing the inner pad 40 tightly around the grip ring 20 and resisting rotation of the inner pad 40 relative to the grip ring 20. However, the edges 41*a* and 41*b* are not bonded together at locations near the standoffs 25, because the standoffs 25 protrude between the edges 41*a* and 41*b*. The outer sleeve 50 is wrapped and fastened around the inner pad 40. The side fastening elements 51*a* and 52*a* are aligned and fastened along the inner pad 40. The end fastening elements 51*b* and 52*b* are aligned and fastened around the outer circumference $C_W$ of the inner pad 40. As can be seen in FIG. 6A, spaces 57 are disposed around the standoffs 25 to allow the outer sleeve 50 to wrap around the standoffs 25.

The installation of the cover 30 will now be described. In order to install the inner pad 40 on the grip ring 20, the inner pad 40 is aligned with the grip ring 20, and the inner pad 40 is folded over the grip ring 20 such that the grip ring 20 is substantially enclosed by the inner pad 40. More particularly, the inner pad 40 is installed as follows. The circumferential gap 41*c* of the inner pad 40 is aligned with the grip ring 20. Then, the following steps are repeated until the inner pad 40 substantially encloses the grip ring 20 and the ends 40*a* and 40*b* are adjacent one another on the grip ring 20: the circumferential gap 41*c* is widened along a section of the inner pad 40 by pulling apart the wall edges 41*a* and 41*b*; a section of the grip ring is then inserted through the circumferential gap 41*c* and into a section of the hollow interior 42; and a section of the wall 41 is then folded around the portion of the grip ring such that the portion of the grip ring is enclosed by the portion of the wall. Thereafter, the adhesive of adhesive elements 46*a* and 46*b* is exposed and the edges 41*a* and 41*b* are pressed and bonded together. Thus, the inner pad 40 tightly encloses the grip ring 20 so as to provide a secure gripping foundation for the user. Because the ends 40*a* and 40*b* are free and the inner pad 40 is relatively flexible, the inner pad 40 may be easily manipulated to be folded around the grip ring 20.

Once the inner pad 40 is installed, the outer sleeve 50 is wrapped around the inner pad 40. More specifically, the following procedure is carried out. The sleeve 50 is first placed over the grip ring 20 such that the inner surface 52 of the outer sleeve 50 is in contact with the outer surface 45 of the inner pad 40. Thereafter, the following steps are repeated until the inner pad 40 is substantially enclosed by the outer sleeve 50: a portion of the sleeve 50 is wrapped tightly around the outer surface 45 of along a portion of the inner pad 40 such that a portion of the second side 54 overlaps a portion of the first side 53 and corresponding portions of the side fastening elements 51*a* and 52*a* are aligned; corresponding portions of the side fastening elements 51*a* and 52*a* are then fastened together around the portion of the inner pad 40. Then, the second end 56 is pulled over the first end 55 on the inner pad 40 such that the end fastening elements 51*b* and 52*b* are aligned. The end fastening elements 51*b* and 52*b* are then fastened together around the outer wall surface 45 of the grip ring 20.

Figure 9:
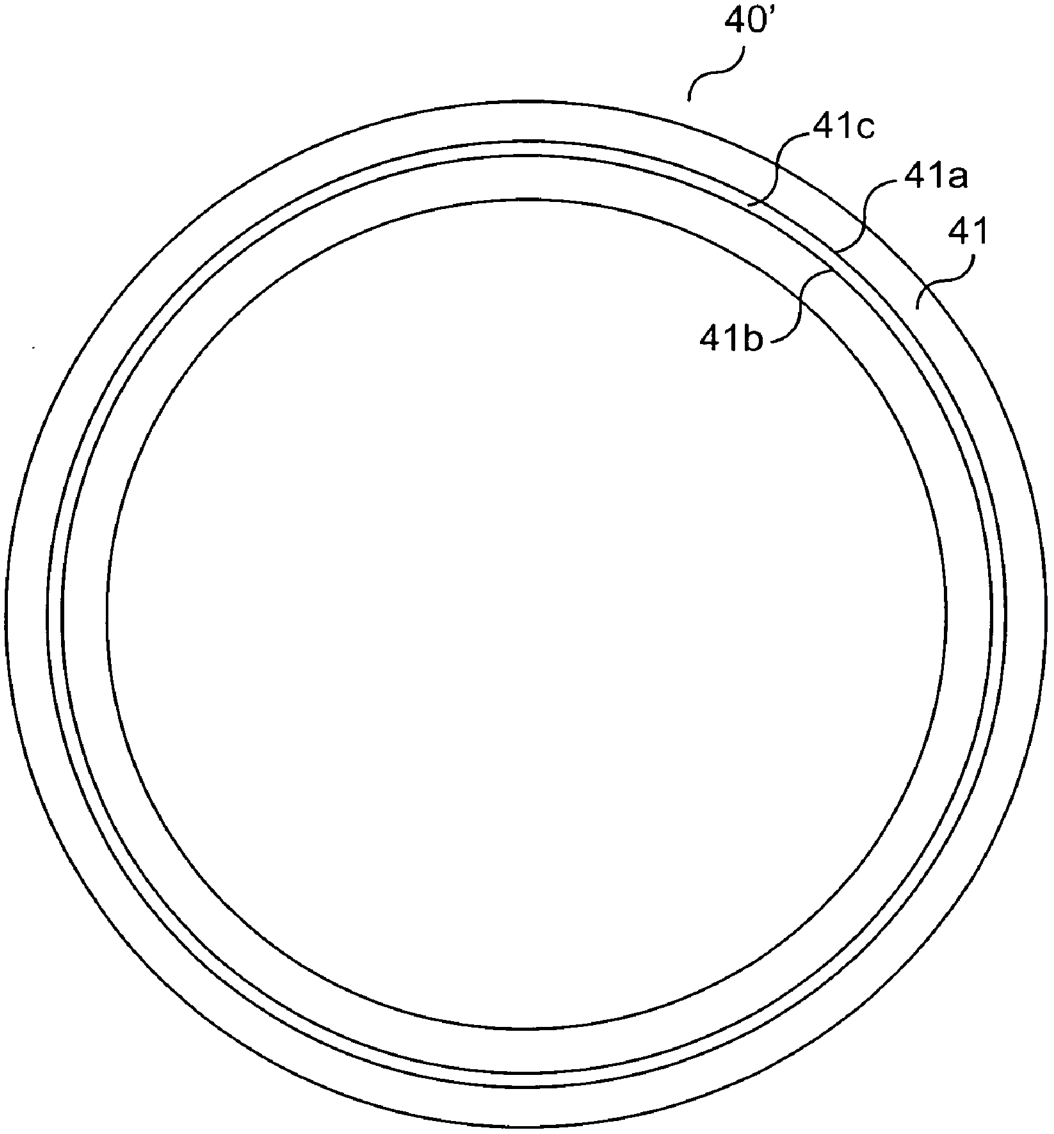
FIG. 9 is an inboard side view of an inner pad for a grip ring cover according to another embodiment of the invention.

According to another embodiment of the invention, an inner pad 40', shown in FIG. 9, is provided in place of inner pad 40. The inner pad 40' is nearly identical to inner pad to 40, except that the inner pad 40 has the form of a continuous ring without the gap 40*c* or ends 40*a* and 40*b*. The inner pad 40' is installed as follows. The circumferential gap 41*c* of the inner pad 40' is aligned with the grip ring 20. Then, the following steps are repeated until the inner pad 40' substantially encloses the grip ring 20: the circumferential gap 41*c* is widened along a section of the inner pad 40 by pulling apart the wall edges 41*a* and 41*b*; a section of the grip ring is then inserted through the circumferential gap 41*c* and into a section of the hollow interior 42; and a section of the wall 41 is then folded around the portion of the grip ring such that the portion of the grip ring is enclosed by the portion of the wall. Thereafter, the adhesive of adhesive elements 46*a* and 46*b* is exposed and the edges 41*a* and 41*b* are pressed and bonded together. Because the inner pad 40' has no free ends, it may be slightly more difficult to install and remove than the inner pad 40. However, the inner pad 40' is advantageous in that it can provide a tighter fit over the grip ring 20.

Figure 11A:
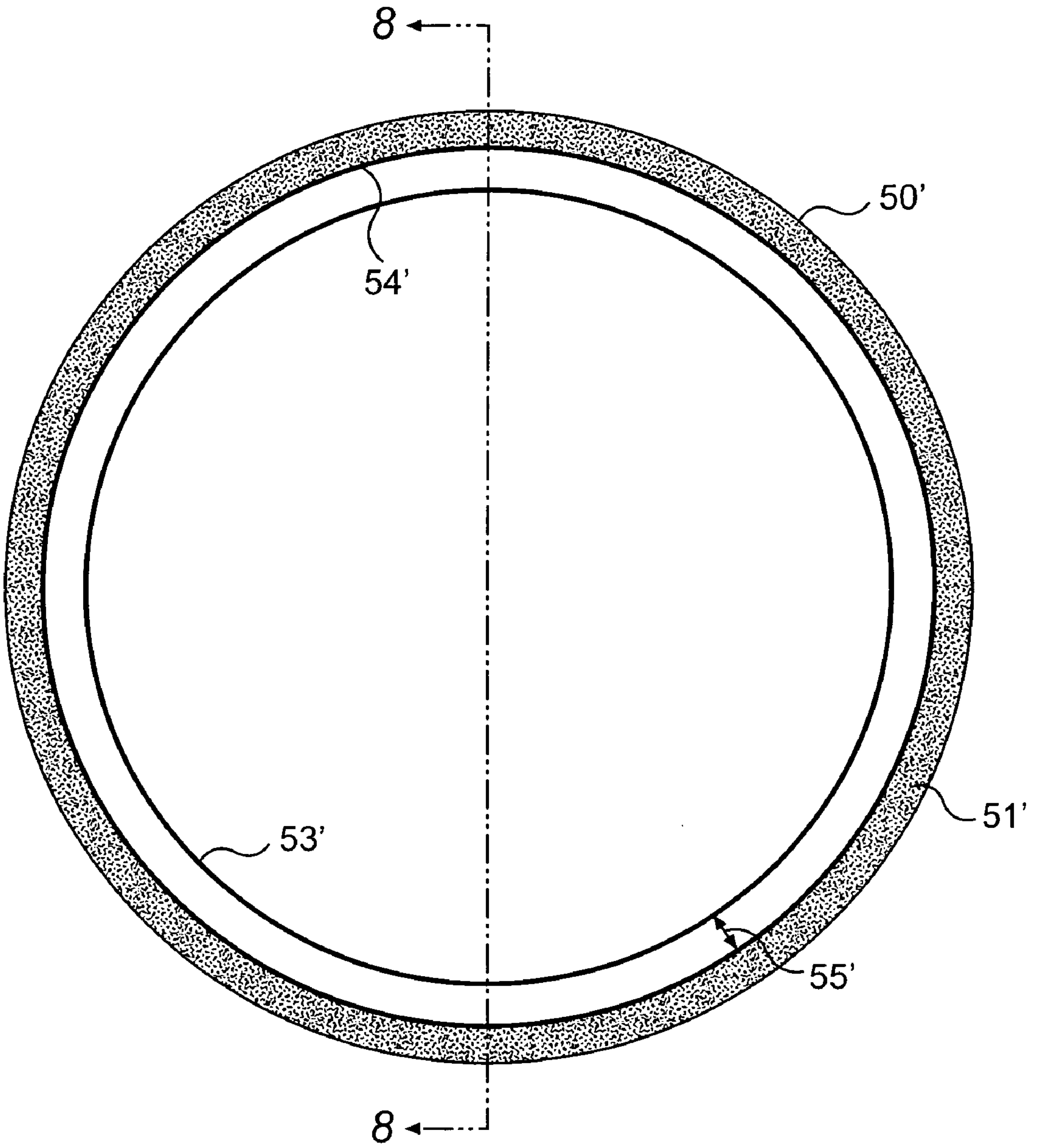
FIG. 11A is a perspective view of an outer sleeve of a grip ring cover according to another embodiment of the invention.
Figure 11B:
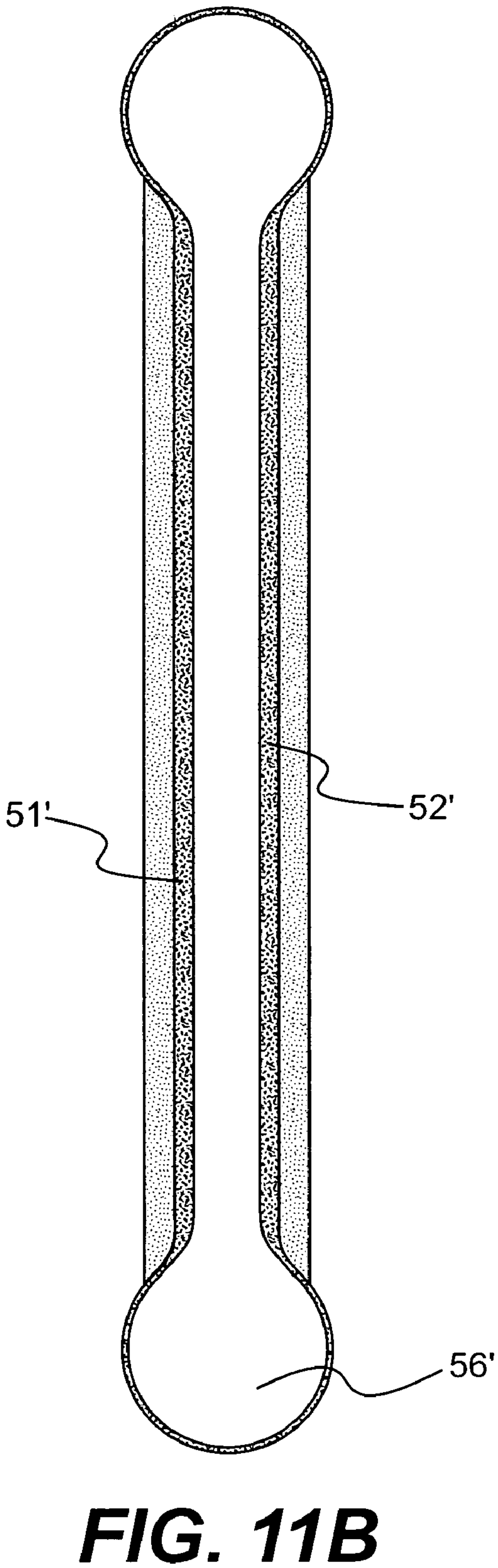
FIG. 11B is a sectional view taken along line 8—8 of FIG. 11A.

According to another embodiment of the invention a stretch-fit outer sleeve 50', shown in FIGS. 11A and 11B may be used instead of the sleeve 50 described above. The sleeve 50' is a substantially ring-shaped, semi-tubular sleeve including a semi-tubular wall 51' having a pair of adjacent annular, elastic edges 53' and 54' separated by an annular gap 55'. The wall 51' defines a hollow interior 56'. The sleeve 50' is installed by aligning the annular gap 55' with the inner pad 40 or 40' and stretching the sleeve 50' onto and over the inner pad 40 or 40' such that a substantial portion of the inner pad 40 or 40' is enclosed within the interior 52'. The sleeve 50' may also include edge fastening elements 51*a'* and 52*a'* disposed proximate the annular edges 53' and 54', respectively. The fastening elements 51*a'* and 52*a'* may be aligned and fastened together to further secure the sleeve 50' on the inner pad 40 or 40'. The stretch-fit sleeve 50' is advantageous in that it can be quickly installed and removed.

According to another embodiment of the invention, the sleeve 50' may be adapted to fit directly over the grip ring 20 without the use of an inner pad 40 or 40'. In such a case, the sleeve 50' is installed by aligning the annular gap 55' with the grip ring 20 and stretching the sleeve 50' onto and over the grip ring 20 such that a substantial portion of the grip ring 20 is enclosed within the interior 52'.

Figure 7A:
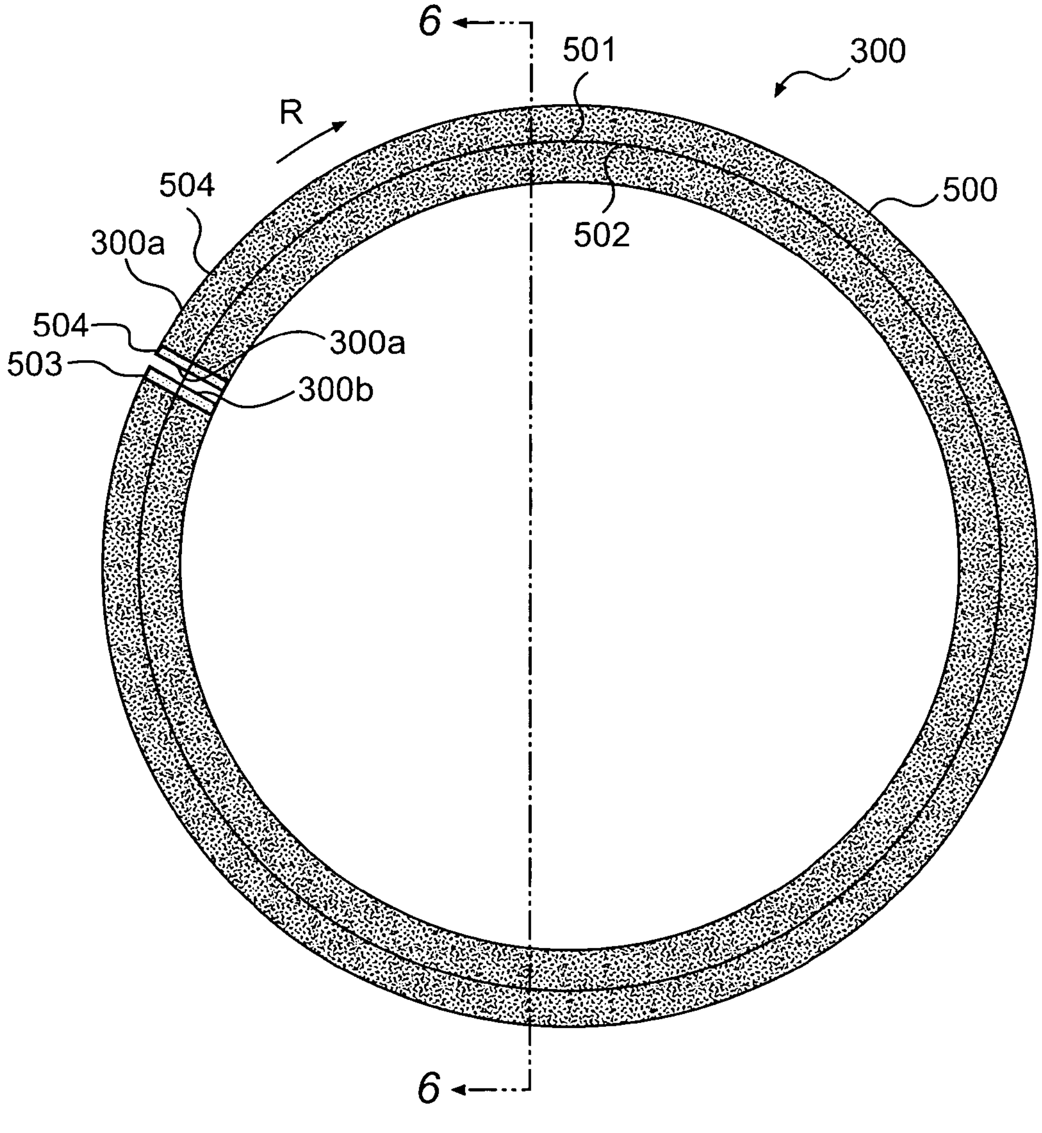
FIG. 7A is an inboard side view of a one-piece grip ring cover according to another embodiment of the invention.
Figure 7B:
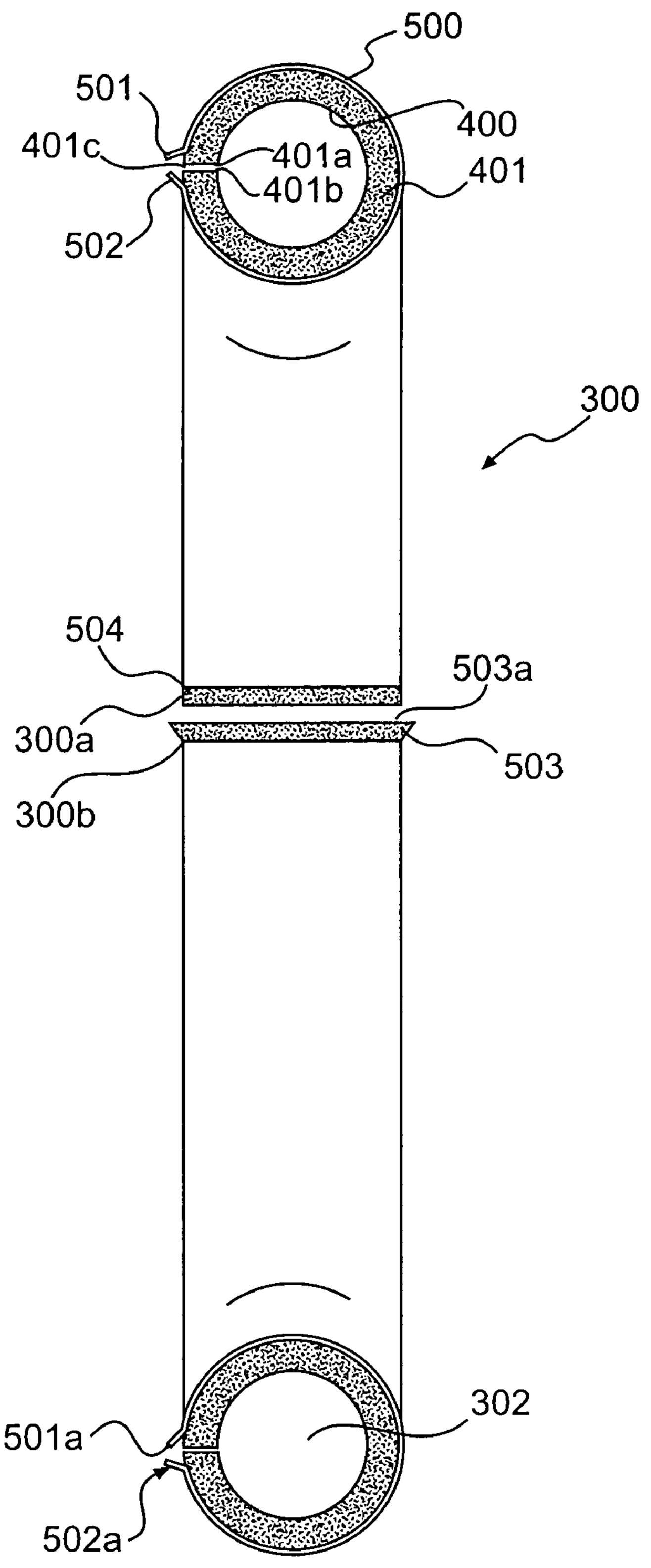
FIG. 7B is a sectional view taken along line 6—6 of FIG. 7A.

According to another embodiment of the invention shown in FIGS. 7A and 7B, a one-piece grip ring cover 300 is provided. The grip ring cover 300 is a generally ring-shaped member comprising a substantially tubular inner pad 400 and an outer sleeve or shell 500 permanently attached to the inner pad 400. The outer shell 500 may be bonded to the inner pad 400 with adhesive, or it may be fused to the inner pad 400 by a heating process. The inner pad 400 and outer shell 500 may be constructed of the same materials as the previously disclosed inner pad 40 and outer sleeve 50.

As shown in FIG. 7A, the cover 300 comprises a generally ring-shaped tube having adjacent first and second free ends 300*a* and 300*b* that are separated by a gap 40*c*. Referring to FIG. 7B, the inner pad 400 includes a substantially tubular wall 401 having first and second edges 401*a* and 401*b* that are separated by a circumferential gap 401*c* that extends circumferentially in the rotational direction R of the grip ring 20. The cover 300 includes a hollow interior 302 bounded by an interior surface of the wall 401.

The outer shell 500 has side flaps 501 and 502 including respective side fastening elements 501*a* and 502*a*. One of the side fastening elements 501*a* and 502*a* is disposed on an interior surface of its side flap, while the other of the side fastening elements 501*a* and 502*a* is disposed on an exterior surface of its side flap. The outer shell 500 further includes an end flap 503 disposed proximate one free end 300*a* or 300*b* of the cover 300, an end flap fastening element 503*a* on an interior surface of the end flap 503 and an end fastening element 504 disposed proximate the other free end 300*b* or 300*a*.

Figure 8A:
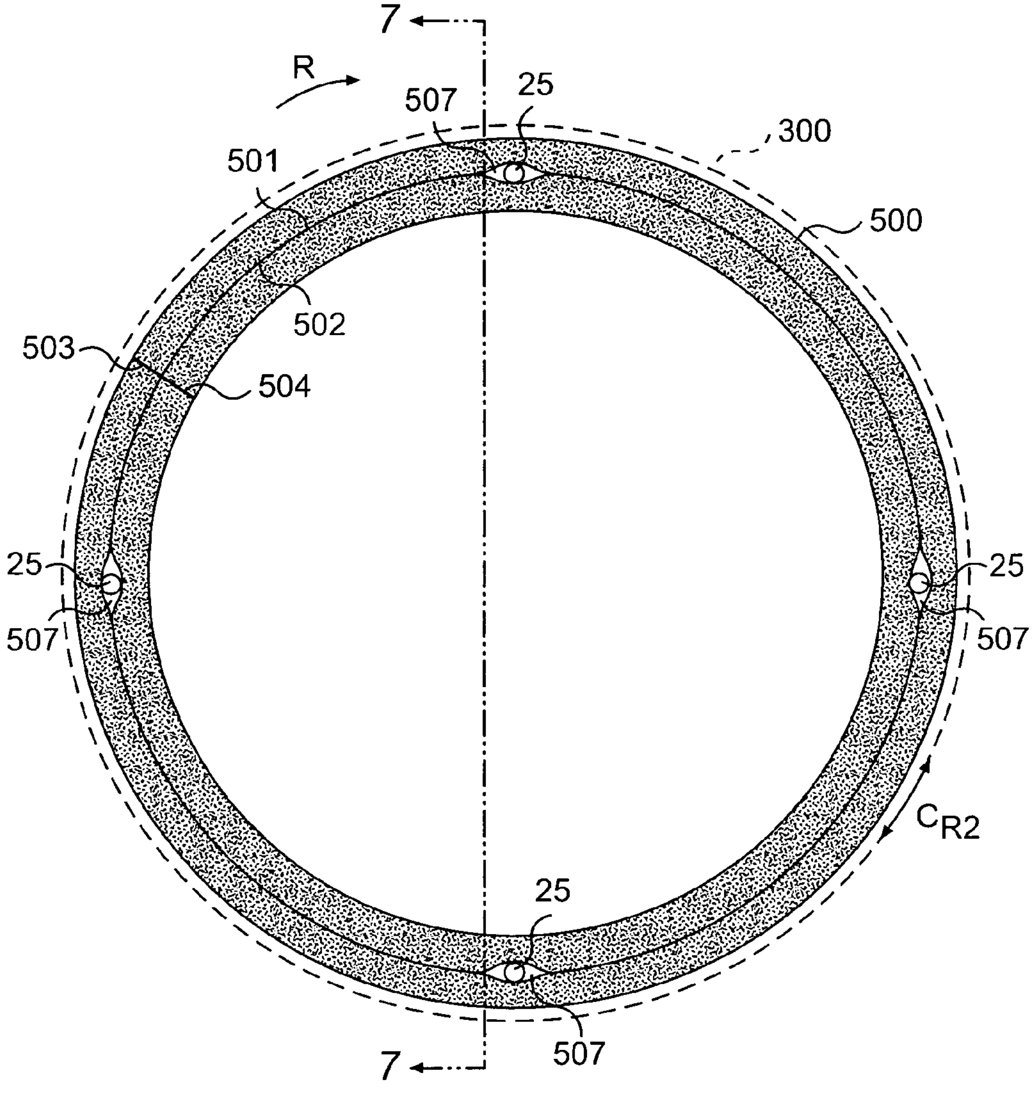
FIG. 8A is an inboard cut-away view of the grip ring cover of FIG. 7A installed on a grip ring.
Figure 8B:
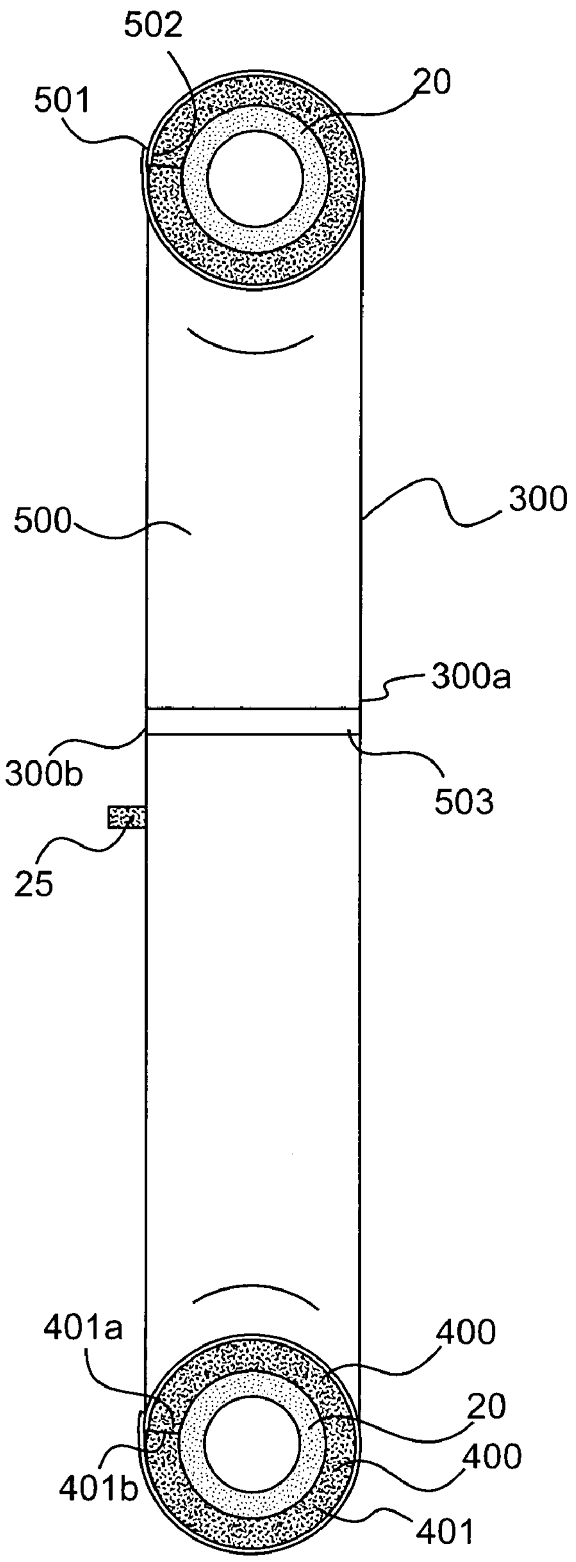
FIG. 8B is a sectional view taken along line 7—7 of FIG. 8A.

FIGS. 8A and 8B show the cover 300 installed on a grip ring 20. The cover 300 encloses the grip ring 20 such that the grip ring is substantially enclosed within the interior 302 of the cover 300. The side flaps 501 and 502 are aligned and fastened together via the fastening elements 501*a* and 502*a*. The end flap 503 overlaps the adjacent free end 300*a* or 300*b* such that the fastening elements 503*a* and 504 are aligned and fastened together, and free ends 300*a* and 300*b* are secured in close proximity to one another. As can be seen in FIG. 8A, spaces 507 are disposed around the standoffs 25 to allow the flaps 501 and 502 to wrap around the standoffs 25.

In order to install the cover 300 on the grip ring 20, the cover 300 is aligned with the grip ring 20, and the cover 300 is folded over the grip ring 20 such that the grip ring 20 is substantially enclosed by the cover 300. More particularly, the cover 300 is installed as follows. The circumferential gap 401*c* of the inner pad 400 is aligned with the grip ring 20. Then, the following steps are repeated until the inner pad 400 substantially encloses the grip ring 20 and the ends 300*a* and 300*b* are adjacent one another on the grip ring 20: the circumferential gap 401*c* is widened along a section of the inner pad 400 by pulling apart the wall edges 401*a* and 401*b*; a section of the grip ring is then inserted through the circumferential gap 401*c* and into a section of the hollow interior 402; and a section of the wall 401 is then folded around the portion of the grip ring 20 such that the portion of the grip ring is enclosed by the portion of the wall 401. Thereafter, the side flaps 501*a* and 502*a* are aligned and fastened together, and the end flap 503 is aligned and fastened with the adjacent free end 300*a* or 300*b*.

Figure 10:
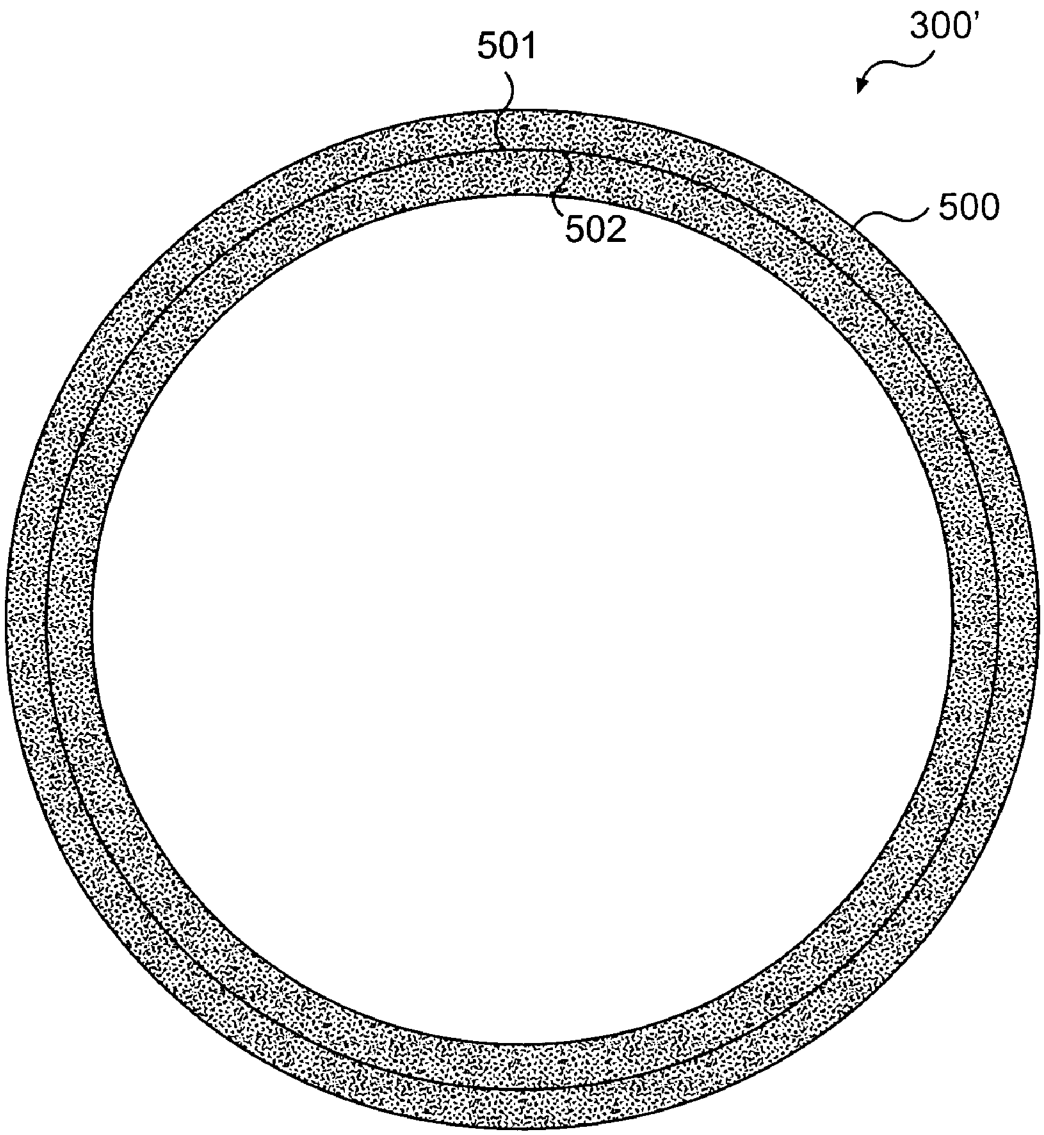
FIG. 10 is an inboard side view of a one-piece grip ring cover according to yet another embodiment of the invention.

According to another embodiment of the invention shown in FIG. 10, a cover 300' is provided. The cover 300' is similar to the cover 300, except that the cover 300' is formed in a continuous ring without the free ends 300*a* and 300*b*, the end flap 503 and the fastening elements 503*a* and 504. The cover 300' is installed in the same manner as the cover 300, except that no fastening of free ends is required.

A grip ring cover according to the present invention can be sized to fit any grip ring. A two-piece cover 30 may be manufactured such that the length L of the outer sleeve 50 and outer rotational circumference $C_R$ of the inner pad 40 or 40' are greater than necessary. Thus, the outer sleeve 50 and inner pad 40 or 40' can be trimmed down to fit grip rings of various sizes. Likewise a one-piece cover 300 may also have an outer rotational circumference $C_{R2}$ that is greater than necessary so that it may be trimmed to fit a variety of grip rings.

According to the present invention, various embodiments of a grip ring cover for a wheelchair are provided. The grip ring cover of the present invention provides an enlarged gripping surface that is comfortable to grip, resistant to slippage and resistant to extreme temperature changes. The grip ring cover is easily assembled on and removed from existing grip rings without requiring disassembly of the grip ring. Additionally, the grip ring cover does not substantially increase the width of the wheelchair, so as not to significantly affect the user's ability to maneuver the wheelchair in tight spaces. Furthermore, the grip ring cover according to the present invention is inexpensive and simple to manufacture.

While the invention has been illustrated in connection with preferred embodiments, variations within the scope of the invention will likely occur to those skilled in the art. Thus, it is understood that the invention is covered by the following claims.

What is claimed as new and desired to be protected by Letters Patent of the United States is:

1. A wheelchair grip ring cover comprising:

an inner pad sized to substantially enclose a grip ring of a wheelchair, wherein said inner pad comprises a substantially ring-shaped member including a substantially tubular wall, and wherein said tubular wall includes first and second adjacent edges separated by a circumferential gap that extends circumferentially along the inner pad in a rotational direction of the grip ring cover; and a removable outer sleeve sized to fit around and substantially enclose said inner pad, wherein said outer sleeve comprises a sheet of material bounded by a first side, a second side opposite said first side, a first end extending between said first and second sides, and a second end opposite said first end and extending between said first and second sides, wherein said outer sleeve includes a first side fastening element disposed proximate said first side and a second side fastening element disposed proximate said second side wherein said first side fastening element and said second side fastening element are arranged to align and fasten together to removably secure said outer sleeve on said inner pad and to thereby secure said inner pad on the grip ring, wherein said outer sleeve includes a first end fastening element disposed proximate said first end and a second end fastening element disposed proximate said second end, and wherein said first and second end fastening elements are arranged to align and fasten together for securing said outer sleeve on said inner pad and for securing said inner pad on said grip ring.

2. The grip ring cover of claim 1, wherein said inner pad is constructed of a soft, resilient material.

3. The grip ring cover of claim 2, wherein the soft, resilient material is foam.

4. The grip ring cover of claim 1, wherein said outer sleeve is constructed of one of the following materials; vinyl, leather or fabric.

5. The grip ring cover of claim 1, wherein said inner pad further comprises adjacent first and second free ends separated by a gap.

6. The grip ring cover of claim 1, wherein said first and second adjacent edges include adhesive elements for bonding said first and second adjacent edges together.

7. The grip ring cover of claim 6, wherein said adhesive elements each comprise an adhesive covering a surface of a respective circumferential edge, and a peel-off strip covering said adhesive.

8. The grip ring cover of claim 1, wherein said outer sleeve includes reflective material.

9. The grip ring cover of claim 1, wherein said outer sleeve comprises luminescent material.

10. The grip ring cover of claim 1, wherein said first side fastening element and said second side fastening element comprise Velcro fasteners.

11. A grip ring assembly for a wheelchair comprising:

a grip ring; and a cover comprising an inner pad and a removable outer sleeve, wherein:

said inner pad substantially encloses said grip ring and said outer sleeve substantially encloses said inner pad;

said inner pad comprises a substantially ring-shaped member including a substantially tubular wall;

said tubular wall includes first and second adjacent edges separated by a circumferential gap that extends circumferentially along the inner pad in a rotational direction of the grip ring cover;

said outer sleeve is a sheet of material bounded by a first side, a second side opposite said first side, a first end extending between said first and second sides, and a second end opposite said first end and extending between said first and second sides;

said outer sleeve includes a first side fastening element disposed proximate said first side and a second side fastening element disposed proximate said second side;

said first side fastening element and said second side fastening element are aligned and fastened together to removably secure said outer sleeve on said inner pad and to thereby secure said inner pad on said grip ring;

said outer sleeve includes a first end fastening element disposed proximate said first end and a second end fastening element disposed proximate said second end; and said first and second end fastening elements are aligned and fastened together for securing said outer sleeve on said inner pad and for securing said inner pad on said grip ring.

12. The grip ring assembly of claim 11, wherein said inner pad is constructed of a soft, resilient material.

13. The grip ring assembly of claim 12, wherein said resilient, soft material is foam.

14. The grip ring assembly of claim 11, wherein said outer sleeve is constructed of one of the following materials: vinyl, leather or fabric.

15. The grip ring assembly of claim 11, wherein said grip ring includes standoffs for connecting said grip ring to a wheel of a wheelchair, and wherein said standoffs are disposed within said circumferential gap.

16. The grip ring assembly of claim 11, wherein said inner pad further comprises adjacent first and second free ends separated by a gap.

17. The grip ring assembly of claim 16, wherein said first and second adjacent edges include adhesive elements for bonding said first and second adjacent edges together.

18. The grip ring cover of claim 17, wherein said adhesive elements each comprise an adhesive covering a surface of a respective circumferential edge, and a peel-off strip covering said adhesive.

19. The grip ring assembly of claim 11, wherein said outer sleeve includes reflective material.

20. The grip ring assembly of claim 11, wherein said outer sleeve comprises luminescent material.

21. The grip ring assembly of claim 11, wherein said fastening elements comprise Velcro fasteners.

22. A wheelchair comprising the grip ring assembly of claim 11.

23. A method for installing a cover on a grip ring of a wheelchair, comprising:

folding an inner pad of said cover over said grip ring; and wrapping and fastening an outer sleeve of said cover around said inner pad, wherein wrapping and fastening said outer sleeve around said inner pad comprises the following steps:

a) placing said outer sleeve over said grip ring such that an inner surface of said outer sleeve is in contact with an outer surface of said inner pad;

b) wrapping a portion of said outer sleeve around said outer surface of said inner pad;

c) aligning and fastening together portions of fastening elements disposed proximate opposing sides of said outer sleeve;

d) repeating steps b) and d) until said outer sleeve substantially encloses said inner pad;

e) pulling a second end of said outer sleeve over a first end of said outer sleeve; and f) aligning and fastening together fastening elements disposed proximate said first and second ends.

24. The method of claim 23, wherein folding said inner pad over said grip ring comprises the following steps:

a) aligning a circumferential gap of said inner pad with said grip ring, wherein said circumferential gap extends along said inner pad in a rotational direction of said grip ring;

b) widening a section of said circumferential gap and inserting a section of said grip ring through said section of said circumferential gap and into a section of a hollow interior of said inner pad;

c) folding a section of a wall of said inner pad around said portion of said grip ring; and d) repeating steps b) and c) until said inner pad substantially encloses said grip ring.

25. The method of claim 24, wherein said inner pad comprises first and second circumferential edges separated by said circumferential gap, and further comprising:

exposing adhesive on said first and second circumferential edges; and pressing and bonding said circumferential edges together.

* * * * *